United States Patent [19]

Ueda et al.

[11] 4,265,526
[45] May 5, 1981

[54] CAMERA PROVIDED WITH A DATA RECORDING DEVICE

[75] Inventors: Hiroshi Ueda, Nara; Mitsuru Saito, Kaizuka, both of Japan

[73] Assignee: Minolta Camera Kabushiki Kaisha, Osaka, Japan

[21] Appl. No.: 926,176

[22] Filed: Jul. 20, 1978

[30] Foreign Application Priority Data

Jul. 22, 1977 [JP] Japan .................................. 52/88488

[51] Int. Cl.³ .......................................... G03B 17/24
[52] U.S. Cl. ..................................... 354/106; 354/109
[58] Field of Search ................. 354/105, 106, 107, 109

[56] References Cited

U.S. PATENT DOCUMENTS

| | | | |
|---|---|---|---|
| 3,590,703 | 7/1971 | Ono . | |
| 4,040,723 | 8/1977 | Groeneweg | 354/109 |
| 4,085,412 | 4/1978 | Voshino | 354/106 |

Primary Examiner—Monroe H. Hayes
Attorney, Agent, or Firm—Wolder, Gross & Yavner

[57] ABSTRACT

A single-lens reflex camera is provided with a data recording device which comprises a member carrying data to be photographed, a data illuminating optical system, means for directing and focussing data carrying light onto a film and an externally operable light path changing member. The data carrying member carries at least two groups of data positioned in respectively relative horizontal and vertical directions. The data illuminating optical system illuminates similar selected sets of data from the two groups and the light path changing member blocks the light from the selected data set oriented in an undesired direction while allowing the passage of light from the other desirably oriented data set alone to be focussed on the film for data recording. A mechanism is provided for selecting the selected group orientation in response to the camera orientation.

8 Claims, 9 Drawing Figures

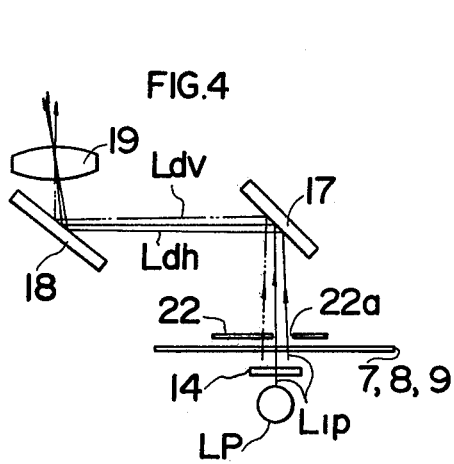
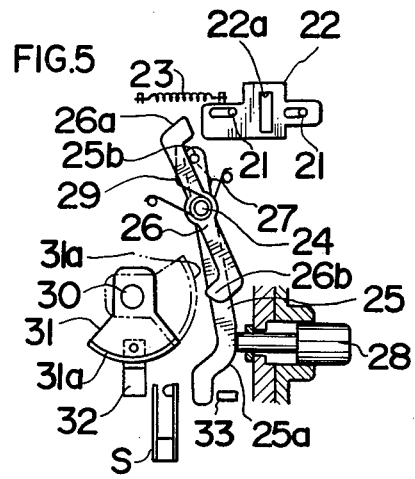
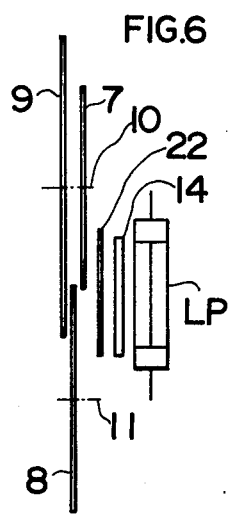
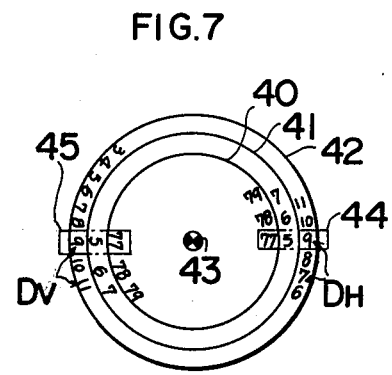
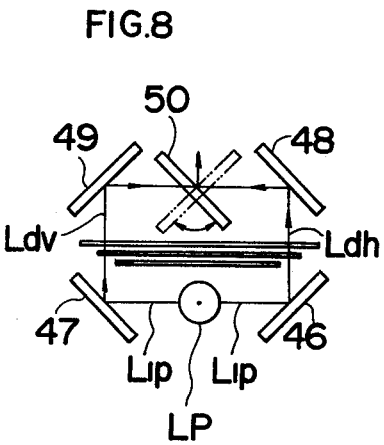
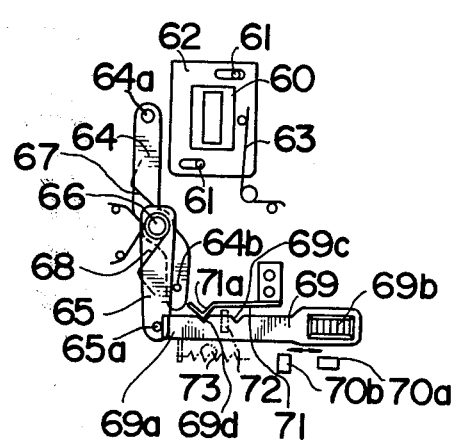

CAMERA PROVIDED WITH A DATA RECORDING DEVICE

BACKGROUND OF THE INVENTION

The present invention relates generally to improvements in cameras provided with a data recording device which records on the film such data as a date or the like and it relates more particularly to an improved camera in which the orientation of the image of data to be recorded on the film may be varied relative to the camera.

Data recording devices heretofore used in cameras are invariable in the directional position or orientation of the image of the data to be recorded on the film, the image of the object and the image of the data being matched in directional position only when the camera is held horizontally for photographing. Accordingly, such cameras have the disadvantage in that it is often difficult to read the data recorded on the film, because the image of the data is positioned in horizontal direction while the image of the object is positioned vertically when photographed with a camera held vertically, both images being unmatched in directional position.

SUMMARY OF THE INVENTION

An object of the present invention is to provide in a camera an improved data recording device for recording on film data alternatively selected from two sets of data oriented in different directions.

Another object of the present invention is to provide an improved data recording device for recording on film an alternative of two sets of similar data differing in orientation from each other.

A further object of the present invention is to provide in a camera an improved data recording device capable of matching the directional positions of the image of an object and the image of the data to be recorded on the film being exposed.

Other and further objects of the present invention will become more fully apparent from the following detailed description of the preferred embodiments thereof taken in conjunction with the accompanying drawings.

BRIEF DESCRIPTION OF THE DRAWINGS

FIG. 4 is a schematic view of the data recording optical system used in the embodiment shown in FIG. 1;

FIG. 5 is an elevational view of the mask plate changing mechanism of the embodiment shown in FIG. 1;

FIG. 6 is a side view of the essential part of another embodiment of the present invention;

FIG. 7 is an elevational view of a data carrying member according to a further embodiment of the present invention;

FIG. 8 is a schematic view of the data recording optical system used in the embodiment shown in FIG. 7; and FIG. 9 is an elevational view of the manual changeover mechanism shown in FIG. 5 according to a modified embodiment of the present invention.

DETAILED DESCRIPTION OF THE PREFERRED EMBODIMENTS

Figure 1:
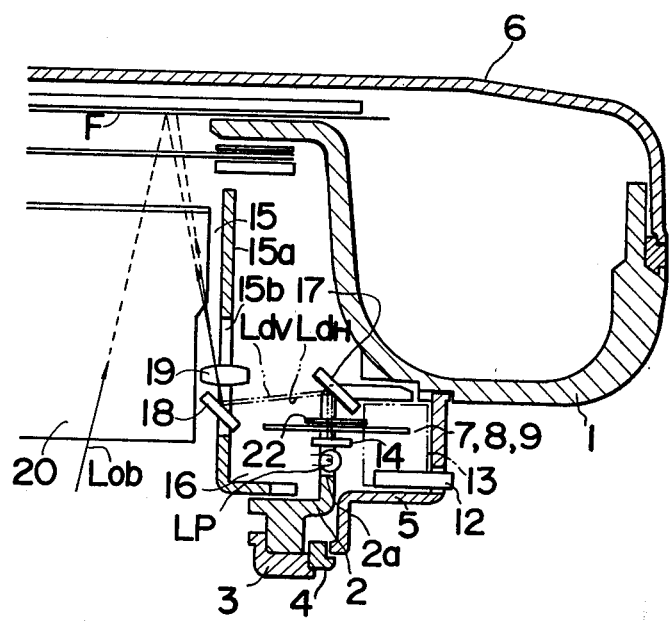
FIG. 1 is a longitudinal cross-sectional view of the essential part of a single lens reflex camera embodying the present invention.
Figure 2:
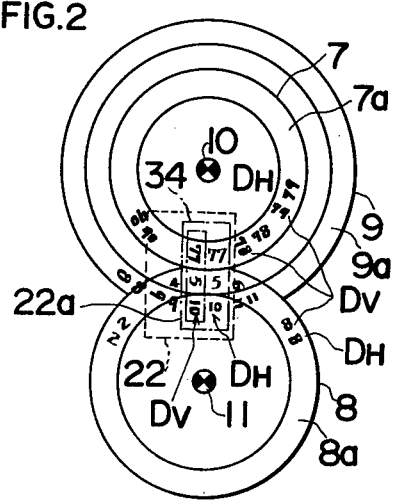
FIG. 2 is an enlarged elevational view of a data carrying member used in the camera of FIG. 1.
Figure 3:
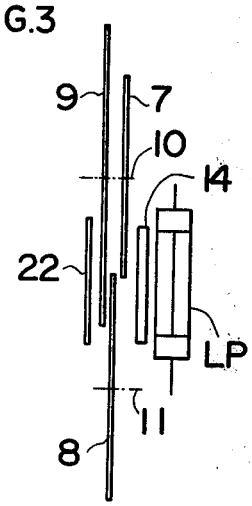
FIG. 3 is a side elevational view of the data carrying member shown in FIG. 2.

Referring to FIGS. 1 through 5 which illustrates a preferred embodiment of the present invention, a front frame 2, a lens mount 3, a diaphragm interlocking member 4, a front cover 5 and lid member 6 delineating a film chamber for housing a film therein are coupled together and related in the well known manner to camera body 1. A data carrying member comprises a year data carrying plate 7, a month data carrying plate 8 and a day data carrying plate 9 to thereby provide such data as the date of a picture being taken. Year data carrying plate 7 and day data carrying plate 9 which is larger in diameter than the year data carrying plate are pivotally mounted on shaft 10, the borders of said plates being data carrying parts 7a and 9a, respectively. Furthermore, month data carrying plate 8 is pivotally mounted on shaft 11 and overlaps plates 7 and 9 so that data carrying part 8a on the border of month data carrying plate 8 may be positioned between data carrying parts 7a and 9a at the data illuminating position in which data can be illuminated by a lamp LP.

Each of data carrying parts 7a, 8a and 9a has numerals representative of the year, month and day respectively, and each such data representation or numeral includes a pair of data, Dh positioned in a horizontal direction and data Dv positioned in a vertical direction which data are circumferentially adjacent, data Dh and Dv of each numeral being circumferentially arranged in alternate sequence. A data setting member 12 is manually operable externally of the camera is coupled through a suitable date setting gear transmission mechanism to each of the data carrying members 7, 8 and 9 to selectively separately rotate data carrying members 7, 8 and 9. This causes a selected pair of data Dh and Dv on each of the year, month and day data sets to be recorded on a film to be positioned at a data illuminating position 34.

Lamp LP and a diffusing plate 14 are arranged in front of data carrying plates 7, 8 and 9, and data recording position 34, both data Dh and Dv located in data illuminating position 34 being illuminated by the diffused light traversing diffusing plate 14 from lamp light L1P. This data illuminating optical system and the data setting mechanism are arranged in a chamber 16 formed by the recessed portion 2a of front frame 2 between side wall 15a of mirror box 15 and front cover 5.

The data carrying light Ldh or Ldv generated from either of the paired data Dh or Dv when illuminated is directed toward film F and focused thereon by a data light optical system comprising first data mirror 17, second data mirror 18 and data lens 19. First data mirror 17 is arranged in recess portion 2a of front frame 2, leading data light Ldh or Ldv from data carrying member 7, 8 and 9 toward mirror box 15. Second data mirror 18 and data lens 19 are positioned and arranged in window portion 15b formed in mirror box 15, whereby to project and focus the data carrying light Ldh or Ldv from first data mirror 17 through the inside of the mirror box 15 onto the film F to prodce an image thereof for data recording. Therefore, when the camera movable mirror 20 is positioned in viewing position and is within the photographing optical path as illustrated in FIG. 1, data light Ldh or Ldv, together with scene light Lob, are reflected by movable mirror 20 and is directed to the field of the camera viewfinder, and when movable mirror 20 is in its photographing position out of the photographing optical path, data light Ldh or Ldv, together with scene light Lob, are directed straight ahead as shown by the dotted line for incidence onto the film F at the camera focal plane.

Behind the data illuminating position 34 of data carrying plates 7, 8 and 9 is mounted a mask plate 22 which is guided by guide pins 21 to be laterally slideable as shown in FIG. 5, the mask plate having an opening 22a which allows only the light from one data set Ldh or Ldv to pass therethrough. Mask plate 22 functions as a light path changing member is slideable to allow the passage of any one of the data light Ldh and Ldv, is usually biased left by spring 23 as shown in FIG. 5, thus being positioned to pass light Ldv of vertically directed data Dv. A transfer mechanism for mask plate 22 includes a shaft 24 on which a mask operating lever 25 and a driving lever 26 are pivotally mounted, lever 25 being biased in a counterclockwise direction by a spring 27 with bottom 25a of lever 25 engaging a depressable data carrying button 28. Lever 26 is biased in a clockwise direction by a spring 29 and normally abuts a stop pin 25b located on the top end of lever 25, the lever 26 being constructed so that it rotates in a clockwise direction to follow the rotation of lever 25, with driving portion 26a on the top end of lever 26 opposed to the left end of mask plate 22. On the side where a detecting part 26b on the bottom of lever 26 rotates to follow lever 25, that is, on the clockwise directional side is provided a control member 31 pivotally mounted on shaft 30. Control member 31 is arranged so that its circumferential edge portion 31a may retreat to a position out of the path of movement of detecting part 26b (positioned as shown by the solid line) when the camera is horizontally held while the portion 31a shifts or swings into the path of movement of detecting part 26b (positioned as shown by the broken line) when the camera is held vertically. A weight member 32 is pivotally mounted on control member 31, and is used to smoothly effect the positional changes of control member 31 shown by the solid and broken lines.

The operating lever 25 is opposed to a signal lever 33 interlocked with movable mirror 20 on the side where bottom part 25a of lever 25 abuts data carrying button 28, and is opposed to switch S of lamp LP on the opposite side, the switch being normally open.

As seen in FIG. 5, upon depression of data carrying button 28 for indicating the data to be photographed, operating lever 25 is rotated clockwise in a direction against spring 27, pushing lever portion 25a against switch S to close the switch to thereby energize and light lamp LP, thus generating data carrying lights Ldh and Ldv. On the other hand, driving lever 26 is biased by spring 29 to follow lever 25 to thereby rotate clockwise, with detecting part 26b moving toward control member 31 to sense the position of the control member. When the camera is held horizontally with the control member 31 being positioned as shown by the solid line, detecting portion 26b remains unhindered by control member 31, and driving lever 26 completely follows lever 25 with driving portion 26a moving mask plate 22 to the right, as shown in FIGS. 1 and 4, against the influence of spring 23. This causes mask plate 22 to be moved right when lamp LP lights, thereby allowing data carrying light Ldh alone to pass through mask 22 by shutting off the other data light Ldv, the data lights being generated immediately upon lamp Lp lighting, thus causing horizontally directed data carrying light Dh to be projected onto the field of a viewfinder. If the camera is vertically held, control member 31 is in the position shown by the broken line, detecting portion 26b abuts edge portion 31a of control member 31, the driving lever 26 being prevented from rotating to follow operating lever 25, thereby causing mask plate 22 to remain in its biased left position unmoved toward the right. This causes mask plate to be maintained in its normal position to allow data light Ldv, as opposed to the above described condition to pass through. As a result, vertically directed data light Dv alone is projected onto the field of the viewfinder.

At the time of photographing, signal lever 33 moves left bottom portion 25a of operating lever 25, as shown in FIG. 5, interlocked with the operation of movable mirror 20 to thereby rotate the said lever 25 in a clockwise direction. This causes lamp LP to light to thereby generate data carrying lights Ldh and Ldv, while effecting the positioning operation of mask plate 22 by driving lever 26 in a manner similar to that described above which allows mask plate 22 to pass one of the data carrying lights Ldh and Ldv in response to the position in which the camera is held, and as a result, one of the horizontally directed data Dh or vertically directed data Dv, that is, only the data oriented in response to and in accordance with the position in which the camera is held, is automatically selected and photographed on film F. It is to be understood that mask plate 22 may be positioned between lamp LP and data carrying member as illustrated in FIG. 6 to control the shut-off or passage of data illuminating light to data carrying member.

According to the above described embodiment, data matching in orientation, the image of an object to be photographed may be recorded on the film, regardless of the position in which the camera is held, thus eliminating the disadvantage of the image of an object being unmatched to the image of the data in directional position or orientation, thereby allowing the recorded data to be readily readable and neat in appearance.

Referring to FIGS. 7 and 8 which show another embodiment of the present invention, the year data carrying plate 40, month data carrying plate 41 and day data carrying plate 42 are pivotally mounted on shaft 43 to constitute a data carrying member. Each of the data carrying plates 40, 41 and 42 has horizontally oriented data Dh and vertically oriented data Dv along the border thereof and is divided into two opposite portions. Horizontally oriented data Dh and vertically oriented data Dv are arranged such that those representing the same year, month and day may be independently concurrently positioned in horizontally directed data recording position 44 and vertically directed data recording position 45, respectively. Light L1P from lamp Lp is reflected by a mirror 46 so as to illuminate horizontally directed data Dh located in horizontally directed data recording position 44, while at the same time vertically directed data Dv located in vertically directed data recording position 45 is illuminated by lamp light reflected by a mirror 47, thereby causing data carrying light Ldh and Ldv to be generated. Each data carrying light Ldh or Ldv is led by data mirrors 48 and 49 constituting part of a data light image recording optical system to a swingable or rotary mirror 50. The rotary mirror 50 is so constructed that when it is rotated to one or the other positions shown by the solid line and that shown by the broken line in FIG. 8, the mirror 50 reflects one or the other of data lights Ldh or Ldv along the data image recording path and blocks the other data light.

Rotary mirror 50 may be operated in relation with control member 31 as described in the first described embodiment of the present invention, with data to be photographed being automatically changed to Dh or Dv.

In the above described embodiment, rotary mirror 50 may be arranged in data illuminating path so as to selectively block one of two illuminating lights which illuminate the data Dh and Dv respectively. Further, the masking plate as mentioned above can be used for the light path changing member in lieu of the rotary mirror 50.

FIG. 9 shows another embodiment of the present invention which includes a mechanism for the manual changing of the data to be recorded on the film. A mask plate 60 for blocking one of the horizontally oriented data or the vertically oriented data light and allowing the other to pass through is mounted on mask plate holder 62 which is slideably guided by pins 61, and is usually biased to the left by a spring 63 to pass the data light of the horizontally oriented data. A driving lever 64 having an operating pin 64a mounted at its top end which is opposed to the left end of holder 62 is pivotally mounted on shaft 66, the driving lever 64 being biased in a clockwise direction by a spring 67, a pin 64b at the bottom of lever 64 abutting an intermediate lever 65 pivoted on shaft 66 and rotating in a clockwise direction to follow the lever 65, intermediate lever 65 being biased in a counterclockwise direction by spring 68. A bottom pin 65a carried by intermediate lever 65 abuts the tip 69a of manual changeover member 69. Manual changeover member 69 is slidable along its longitudinal direction as indicated by a double headed arrow and has an operating portion 69b projecting to the outside of the camera, thereby being selectively movable to a horizontally oriented data recording position (shown in FIG. 9) as symbolized by index 70a and a vertically oriented data recording position as symbolized by index 70b. Manual changeover member 69 is maintained in its selected position by engageable portion 71a of a click spring 71 being engaged with a selected recess 69c and 69d in changeover member 69.

When changeover member 69 is in its horizontally oriented data recording position in registry with index 70a as shown in FIG. 9, intermediate lever 65 is in the position where it maintains the driving lever 64 in its counterclockwise position against influence of the spring 67. This causes operating pin 64a of driving lever 64 to be retracted from holder 62 which is biased by spring 63 to position mask plate 60 in its horizontally oriented data recording position. Therefore, when photographing is performed in this condition, horizontally oriented data is photographed or recorded on the film.

When changeover member 69 is moved to the left for vertically oriented data recording, aligned with index 70b, intermediate lever 65 rotates clockwise against the influence of spring 68 with bottom pin 65a being pushed, and driving lever 64 also rotates clockwise to follow lever 65. This causes lever 64 to move holder 62 to right against spring 63 and under the urging of pin 64a on the top end of lever 64, thereby moving mask plate 60 to its vertically oriented data recording position. As a result, when photographing is performed in this condition, vertically directed data is photographed or recorded on the film.

In the last described embodiment, changeover member 69 is manually operated by the photographer. However, photographing is generally performed in most cases with the camera being held horizontally, and even when photographing is performed with the camera held vertically, simple and speedy operation for changeover of data orientation may be obtained by the following modification.

Providing a spring 73 for urging the changeover member 69 toward its horizontally oriented data recording position where it is in registry with the symbol 70a, and signal lever 72 which is moved to abut the engaging portion 71a of the click spring 71 for releasing the engagement between the click spring 71 and changeover lever 69 upon completion of exposure, thereby the changeover member 69 is automatically fed back by force of spring 73 to horizontally directed data recording position.

While there have been described and illustrated preferred embodiments of the present invention, it is apparent that numerous alterations, omissions and additions may be made without departing from the spirit thereof.

We claim:

1. A camera having an objective lens and a focal plane onto which objective light traversing the objective lens is focused, said camera comprising:
 data carrying means carrying at least two pieces of data oriented in relatively different directions;
 illuminating means including a light source for concurrently illuminating said data pieces;
 light projector means for directing said focusing images of said illuminated data onto said focal plane; and
 data transfer means for alternatively disabling the projection of one of said data images onto said focal plane whereby only one of the data images is incident on said focal plane;
 said data transfer means including a light blocking member movable between a first position for blocking light from one of said data pieces and a second position for blocking the light from the other of said data pieces; and
 a biasing member urging said blocking member to its first position, a drive member movable between a rest position and a drive position for moving said blocking member to its second position against the influence of said biasing member, an operating member movable in response to the camera shutter release operation, a spring member intercoupling said drive and operating members so as to move said drive member to its second position when said operating member is moved and a control member movable into and out of the path of movement of said drive member in response to the angular position of said camera body to respectively prevent and permit the movement of said drive member from movement of its drive position.

2. A camera having an objective lens and a focal plane onto which objective light traversing the objective lens is focused, said camera comprising:
 data carrying means carrying at least two pieces of data oriented in relatively different directions;
 illuminating means including a light source for concurrently illuminating said data pieces;
 light projector means for directing and focusing images of said illuminated data onto said focal plane; and data transfer means for alternatively disabling the projection of one of said data images onto said focal plane whereby only one of the data images is incident on said focal plane;

said data transfer means including a light blocking member movable between a first position for blocking light from one of said data pieces and a second position for blocking the light from the other of said data pieces; and an operating member manually movable between a first and second position and interlocking means interlocking said blocking member with said operating member so as to move said blocking member to its first position in response to the movement of said operating member to its first position and to move said blocking member to its second position in response to the movement of said operating member to its second position.

3. A camera having an objective lens and a focal plane onto which objective light traversing the objective lens is focused, said camera comprising:

data carrying means carrying at least two pieces of data oriented in relatively different directions;

illuminating means including a light source for concurrently illuminating said data pieces;

light projector means for directing and focusing images of said illuminated data onto said focal plane;

data transfer means for alternatively disabling the projection of one of said data images onto said focal plane whereby only one of the data images is incident on said focal plane; and said illuminating means including means providing two separate illuminating paths, said data carrying means is so arranged as to position a data piece in each of said illuminating paths, and said data transfer means includes a movable mirror, a first mirror reflecting light from one of said data pieces toward said movable mirror, and a second mirror for reflecting light from the other of said data pieces toward said movable mirror, said movable mirror being movable between a first position for reflecting the incident light reflected from said first mirror to said projector means and a second position for reflecting the incident light reflected from said second mirror to said projector means.

4. A camera having an objective lens and a focal plane onto which object light traversing the objective lens is focused, said camera comprising:

a light emitting element having a light travelling optical path;

data carrying means carrying thereon a plurality of vertical data pieces positioned in a vertical direction and a corresponding number of horizontal data pieces positioned in a relatively horizontal direction, said data carrying member being externally manually movable for selectively positioning a pair of corresponding vertical and horizontal data pieces in said light travelling optical path whereby two differently oriented illuminated data pieces are produced;

light projector means for directing and focusing images of said illuminated data pieces onto said focal plane; and data transfer means including a light blocking member movable for alternatively disabling the projection of one of said data pieces positioned in said light path, whereby an image of only one of said illuminated data pieces is projected onto said focal plane; and said data transfer means further including a drive member intercoupled with said blocking member and movable between first and second positions, in its first position said drive member displacing said blocking member to mask either one of said vertical and horizontal data pieces and in a second position displacing said blocking member to mask the other data piece, a control member movable into or out of the path of movement of said drive member in response to the angular position of said camera to thereby respectively prevent or permit the displacement of said drive member to the second position, and operating means for urging said drive member from its first position to its second position in response to the camera shutter release operation.

5. A camera as set forth in claim 4 wherein said operating means includes an operating member advanceable in response to the camera shutter release operation and a spring intercoupling said operating member with said drive member for advancing said drive member to its second position upon advance of said operating lever.

6. A camera as set forth in claim 5, wherein said light emitting element includes an electric light emitting element; and further comprising a mirror positioned between said objective lens and said focal plane and movable between an operating position to reflect object light and data image light in a predetermined direction and a rest position to allow the passage of said object light and data image light to said focal plane; a switch for controlling the electric current to said light emitting element, said switch being positioned in the path of movement of said operating member and being closed so as to supply electric current to said light emitting element when said operating member is advanced; and a manually operable member for advancing said operating member.

7. A camera having an objective lens and a focal plane onto which object light traversing the objective lens is focused, said camera comprising:

a light emitting element having a light travelling optical path;

data carrying means carrying thereon a plurality of vertical data pieces positioned in a vertical direction and a corresponding number of horizontal data pieces positioned in a relatively horizontal direction, said data carrying member being externally manually movable for selectively positioning a pair of corresponding vertical and horizontal data pieces in said light travelling optical path whereby two differently oriented illuminated data pieces are produced;

light projector means for directing and focusing images of said illuminated data pieces onto said focal plane; and data transfer means including a light blocking member movable for alternatively disabling the projection of one of said data pieces positioned in said light path, whereby an image of only one of said illuminated data pieces is projected onto said focal plane; and said data transfer means including an operating member manually movable between first and second positions and interlocking means intercoupling said blocking member with said operating member so as to move said blocking member to a position masking the vertical data piece upon said operating member being positioned in its first position and to move said blocking member to a position masking the horizontal data piece in response to the movement of said operating member to its second position.

8. A camera as set forth in claim 7, wherein said data transfer means further includes a spring for biasing said operating member to its first position, means for maintaining said operating member in its second position against the influence of said spring when the operating member is moved to its second position, and a reset member having an active position disabling said means and an inactive position, said reset member being moved to active position from its inactive position in response to the camera shutter release operation.

* * * * *